(12) United States Patent
Yao et al.

(10) Patent No.: US 8,125,735 B2
(45) Date of Patent: Feb. 28, 2012

(54) VIBRATION SENSOR, SUSPENSION, HEAD GIMBAL ASSEMBLY AND MANUFACTURING METHOD THEREOF, AND DISK DRIVE UNIT INCLUDING THE SAME

(75) Inventors: MingGao Yao, Dongguan (CN); YiRu Xie, Dongguan (CN); Lin Guo, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 493 days.

(21) Appl. No.: 12/385,629

(22) Filed: Apr. 14, 2009

(65) Prior Publication Data

US 2010/0259851 A1 Oct. 14, 2010

(51) Int. Cl.
*G11B 15/62* (2006.01)

(52) U.S. Cl. .................................................. 360/234.6

(58) Field of Classification Search ............... 360/244.1, 360/234.6
See application file for complete search history.

(56) References Cited

U.S. PATENT DOCUMENTS

| 4,197,566 | A | * | 4/1980 | Suzuki et al. | 360/246.6 |
| 6,751,062 | B2 | * | 6/2004 | Kasajima et al. | 360/234.6 |
| 2004/0207957 | A1 | * | 10/2004 | Kasajima et al. | 360/234.6 |
| 2008/0229842 | A1 | | 9/2008 | Ohtsuka et al. | |

* cited by examiner

*Primary Examiner* — Hoai V Ho
*Assistant Examiner* — Jay Radke
(74) *Attorney, Agent, or Firm* — Nixon & Vanderhye PC

(57) ABSTRACT

A vibration sensor for a slider includes a base portion, a loading portion adapted for supporting the slider mounted thereon and formed within the base portion, and at least two connection arms connecting the base portion with the loading portion. The vibration sensor of the present invention can sensitively sense a vibration of the slider, thus maintaining the flying height of the slider, and finally improving the performance thereof. The invention also discloses a suspension, a head gimbal assembly and a manufacturing method thereof, and a disk drive unit including the same.

24 Claims, 18 Drawing Sheets

VIBRATION SENSOR, SUSPENSION, HEAD GIMBAL ASSEMBLY AND MANUFACTURING METHOD THEREOF, AND DISK DRIVE UNIT INCLUDING THE SAME

FIELD OF THE INVENTION

The present invention relates to information recording disk drive devices and, more particularly, to a vibration sensor for sensing a slider vibration, suspension, head gimbal assembly (HGA) and manufacturing method thereof, and disk drive unit including the same.

BACKGROUND OF THE INVENTION

Hard disk drives are common information storage devices. FIG. 1 provides an illustration of a typical disk drive unit with a typical drive arm 104 configured to read data from and write data to a magnetic hard disk 101. Typically, a spindling voice-coil motor (VCM) is provided for controlling the motion of the drive arm 104. The top of the drive arm 104 has a suspension 105 mounted thereon, which supports a slider 103 with a read/write transducer (not show). When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

As consumers constantly desiring greater storage capacity for such disk drive devices, as well as faster and more accurate reading and writing operations, different methods are used to improve the recording density of information recording disk drive unit. At the same time, different methods are also widely utilized to achieve higher head positioning precision.

One methodology for the head accuracy position control with the small track pitch is implementing dual stage actuator (DSA). A second micro-actuator is being utilized to control the slider with the read/write head, with the first VCM utilized for course adjustment and the micro-actuator then correcting the placement on a much smaller scale to compensate for the resonance of the VCM. This enables a smaller recordable track width, increasing the 'tracks per inch' (TPI) value of the disk drive unit by 50%, which increases the density.

Another technology for head position control is to sense and compensate the air turbulence which is due to air flutter when the disk is being spindled. The air turbulence may cause the head suspension vibration which will cause the head off-track, as disclosed in US patent No. 20080229842. FIGS. 2b-2c show respectively cross-section reviews taken along line 6-6 and 7-7 in FIG. 2a. Referring to FIGS. 2a-2c, a load beam 11 is coupled with a base plate 10. A flexure 12 having a slider 13 mounted thereon is welded to the load beam 11 and the base plate 10. A vibration sensor 14 is mounted on the hollow portion of the load beam 11 by an adhesive. The vibration sensor 14 is a PZT unit which has a upper electrode 23, a lower electrode 24 and a PZT material 25 sandwiched therebetween, and two electrode terminal pads 18 and 19 of the vibration sensor 14 are connected with suspension traces 20 of the flexure 12 by conductive adhesive 28 and 27, respectively. When a vibration happens, the vibration sensor 14 will sense the suspension vibration in the suspension elastic port 22 and generate a signal. According to this signal, the position of the slider 13 can be adjusted.

FIG. 3 illustrates a side elevational view of a HGA shown in FIG. 2a. In FIG. 3, it is clear that the vibration sensor 14 is mounted at the juncture of the base plate 10 and the load beam 11, which is the suspension forming location. Since the vibration sensor 14 is located in the suspension hinge location, it has lower sensitivity for sensing the vibration of the suspension, much less the slider 13. Further, during the manufacture process of the suspension and the HGA, since per gram load and pitch static angle/roll static angle (PSA/RSA) need to be controlled, the suspension have to go through a pre-forming process, which may cause damage to the vibration sensor 14.

Accordingly, it is desired to provide an improved vibration sensor for a HGA to overcome the above-mentioned drawbacks.

SUMMARY OF THE INVENTION

One objective of the present invention is to provide a vibration sensor for sensitively sensing a vibration of a slider of a HGA, thereby adjusting the flying height of the slider so as to improve the performance of the slider.

Another objective of the present invention is to provide a suspension having a vibration sensor for sensitively sensing a vibration of a slider of a HGA, thereby adjusting the flying height of the slider so as to improve the performance of the slider.

Still another objective of the present invention is to provide a HGA having a vibration sensor, mounted between a slider and a suspension thereof, to achieve big sensitivity for the vibration of the slider, thereby adjusting the flying height of the slider so as to improve the performance thereof.

Another objective of the present invention is to provide a disk drive unit having a vibration sensor, mounted between a slider and a suspension thereof, to achieve big sensitivity for the vibration of the slider, thereby adjusting the flying height of the slider so as to improve the performance thereof.

Yet another objective of the present invention is to provide a method for manufacturing a HGA having a vibration sensor for sensitively sensing a vibration of a slider of the HGA, thereby adjusting the flying height of the slider so as to improve the performance thereof.

To achieve above objectives, a vibration sensor for a slider includes a base portion, a loading portion for supporting the slider mounted thereon formed within the base portion, and at least two connection arms connecting the base portion with the loading portion.

As an embodiment of the present invention, the connection arms of the sensor are symmetric about a centre point of the loading portion.

As another embodiment of the present invention, the loading portion of the sensor has a plurality of through holes formed therein. Preferably, the through holes are symmetric about a centre point of the loading portion.

As still another embodiment of the present invention, the loading portion of the sensor is ellipse shape, squareness, or circular.

As yet another embodiment of the present invention, the vibration sensor includes a top electrode layer, a bottom electrode layer and a PZT layer sandwiched between the top electrode layer and the bottom electrode layer.

A suspension for a HGA includes a flexure with a suspension tongue for supporting a slider of the HGA, and a vibration sensor mounted on the suspension tongue and sandwiched between the suspension tongue and the slider.

A HGA includes a slider, a suspension having a flexure with a suspension tongue for supporting the slider, and a vibration sensor mounted on the suspension tongue and sandwiched between the slider and the suspension tongue.

A disk drive unit comprises a HGA including a slider and a suspension with a suspension tongue that supports the slider, a drive arm connected to the head gimbal assembly, a disk, and a spindle motor operable to spin the disk. The HGA further comprises a vibration sensor mounted on the suspension tongue and sandwiched between the slider and the suspension tongue.

A method for manufacturing a HGA comprises: providing a vibration sensor and a suspension with a suspension tongue having a structure corresponding to the vibration sensor, the vibration sensor comprising a base portion, a loading portion formed within the base portion, and at least two connection arms connecting the base portion with the loading portion; mounting the vibration sensor on the suspension tongue; and providing a slider and mounting the slider on the loading portion of the vibration sensor with the vibration sensor sandwiched between the slider and the suspension tongue.

In comparison with the prior art, the vibration sensor is mounted on the suspension tongue and sandwiched between the slider and the suspension tongue, so bigger sensitivity for the vibration of the slider is desirably achieved, thereby adjusting the slider flying height so as to improve the performance of the slider.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a partial side elevational view of the HGA shown in FIG. 2a;

FIG. 5b is an exploded perspective view of the HGA shown in FIG. 5a;

DETAILED DESCRIPTION OF ILLUSTRATED EMBODIMENTS

Figure 1:
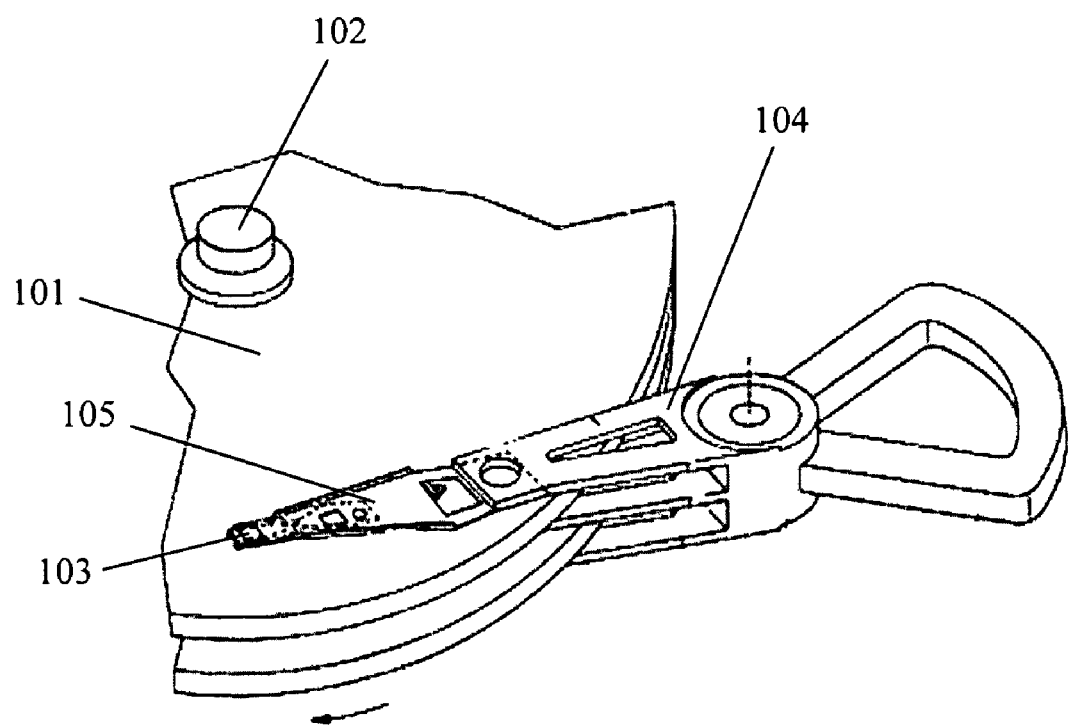
FIG. 1a is a partial perspective view of a conventional disk drive unit.
Figure 2A:
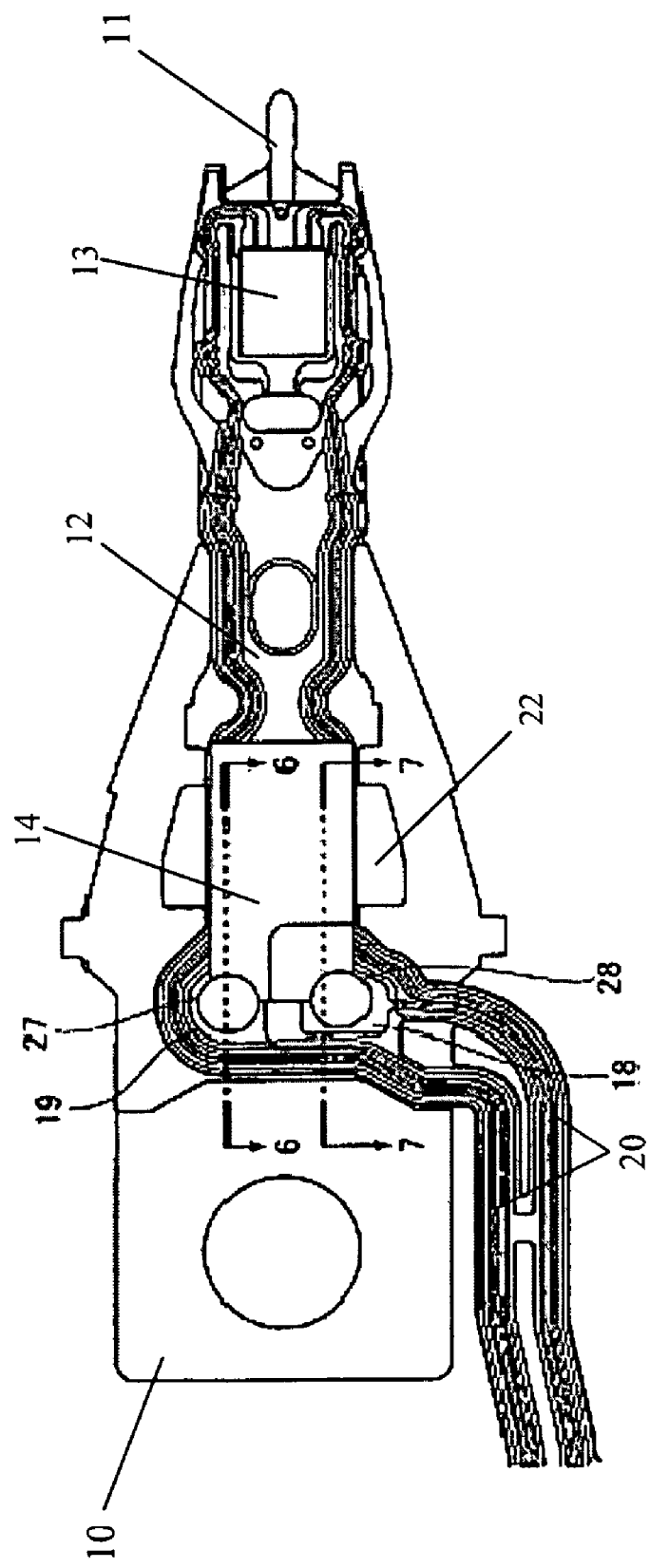
FIG. 2a is a partial top plan view of a conventional HGA.
Figure 2B:
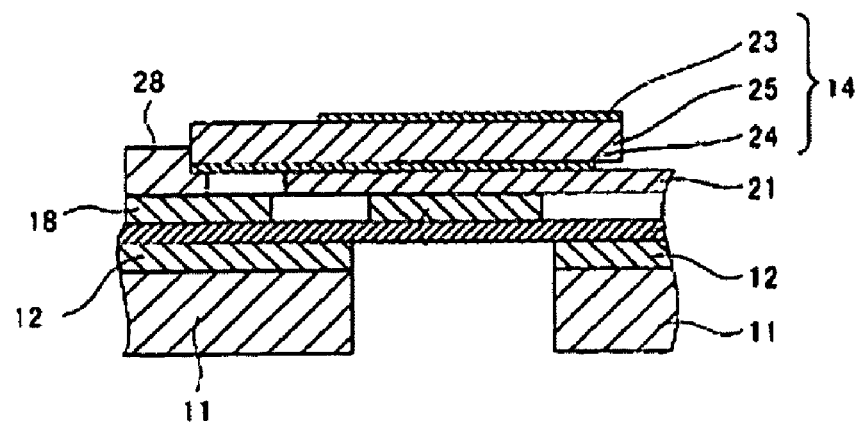
FIG. 2b is a cross-sectional side view of the HGA shown in FIG. 2a taken along the line 6-6 thereof.
Figure 2C:
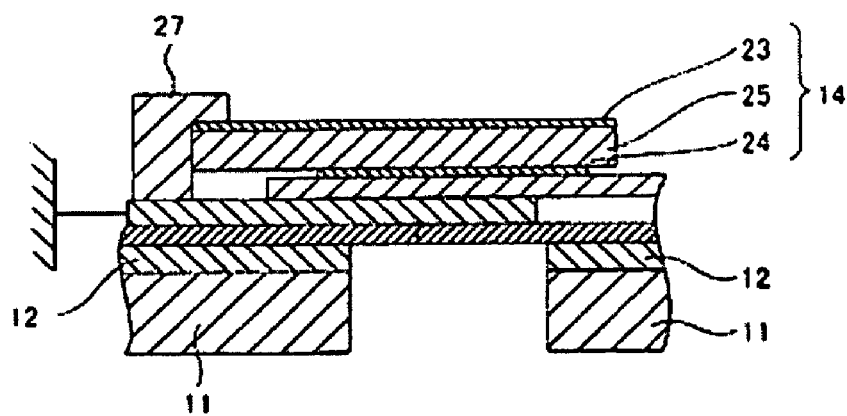
FIG. 2c is a cross-sectional side view of the HGA shown in FIG. 2a taken along the line 7-7 thereof.
Figure 3:
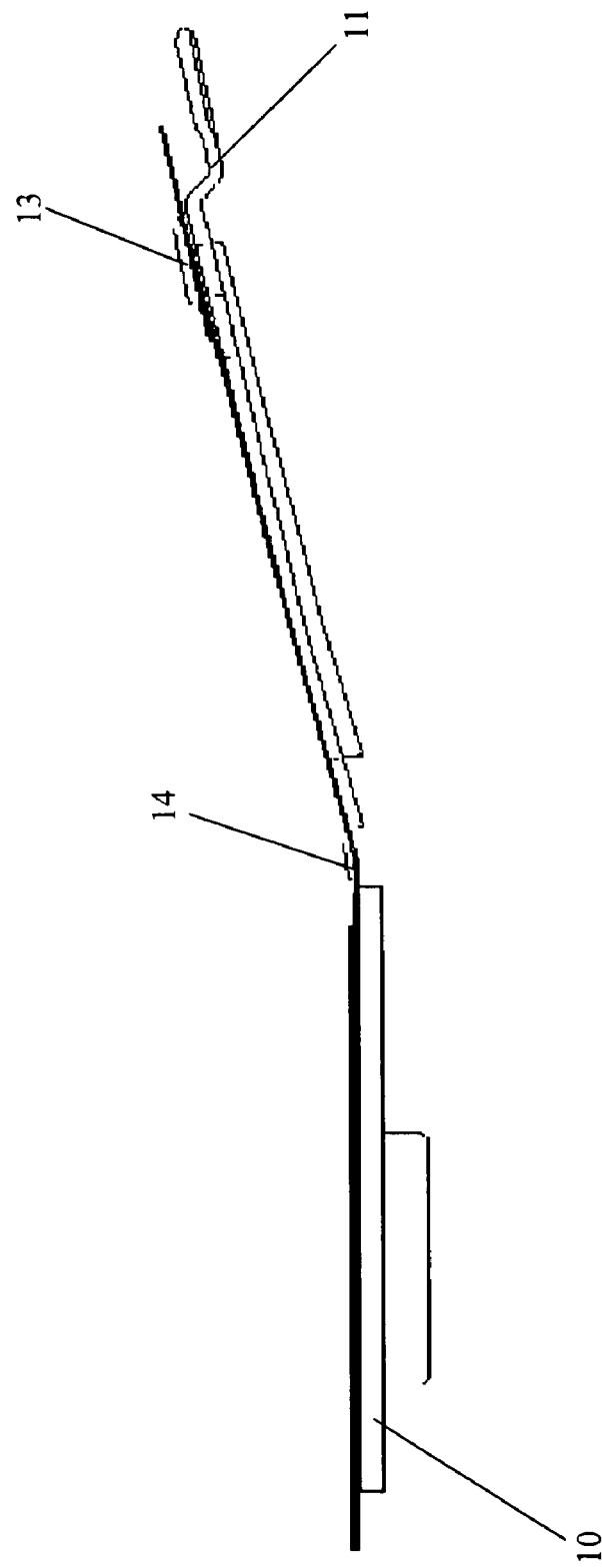

Various preferred embodiments of the invention will now be described with reference to the figures, wherein like reference numerals designate similar parts throughout the various views. As indicated above, the invention is directed to a suspension for a HGA of a disk drive unit, which includes a vibration sensor having a base portion, a loading portion for supporting a slider of the head gimbal assembly mounted thereon and formed within the base portion, and at least two connection arms connecting the base portion with the loading portion. By mounting the vibration sensor with lower stiffness on the suspension tongue and sandwiching it between the suspension tongue and the slider, bigger sensitivity for the vibration of the slider is desirably obtained, thus improving reading/writing characteristics of the slider and performance of the entire disk drive device.

Figure 4:
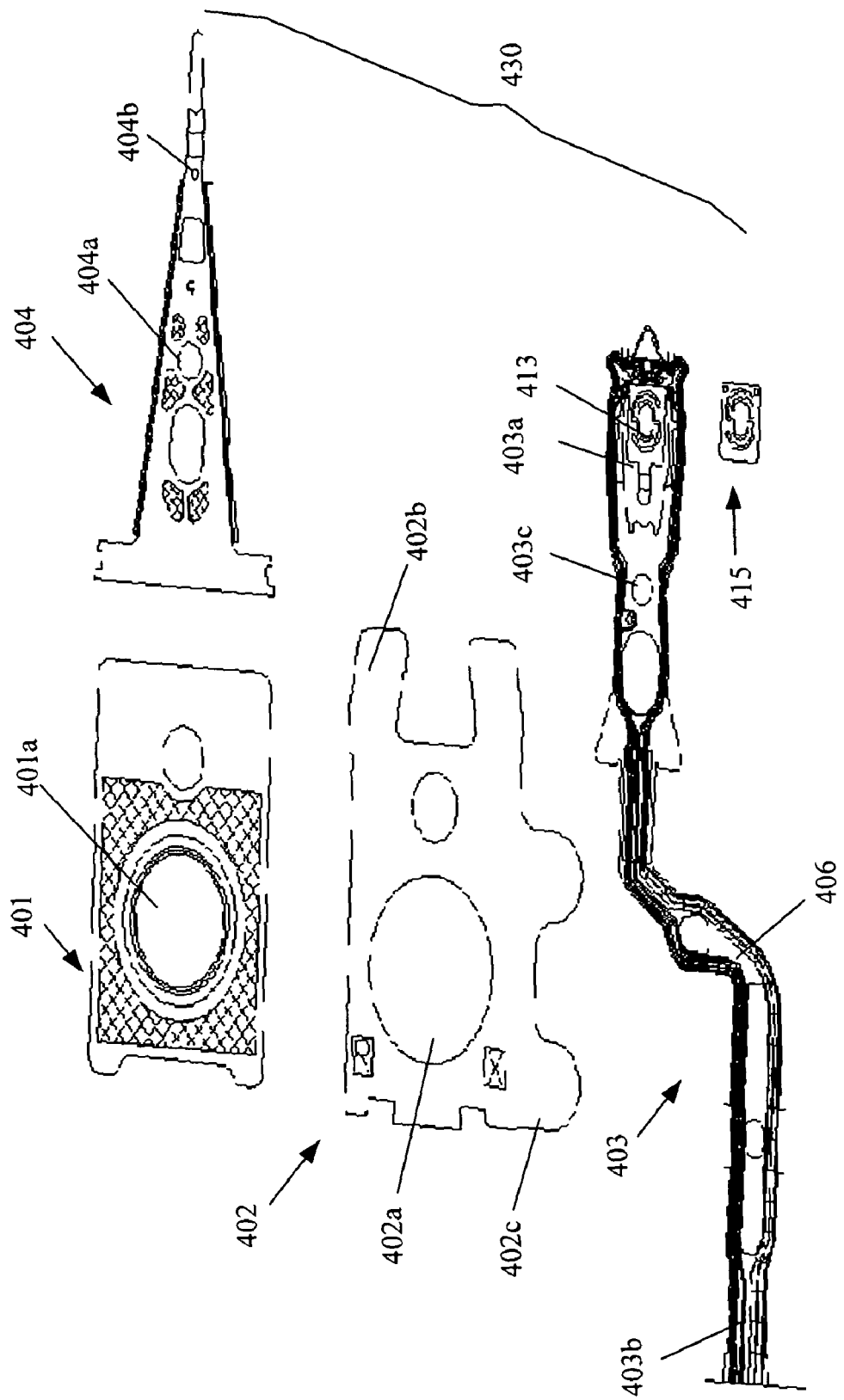
FIG. 4 is an exploded perspective view of a suspension according to a first embodiment of the present invention.

FIG. 4 shows a first embodiment of a suspension of the present invention. As illustrated in FIG. 4, a suspension 430 including a load beam 404, a base plate 401, a hinge 402, a flexure 403, and a vibration sensor 415, all of which are assembled with each other.

Figure 5A:
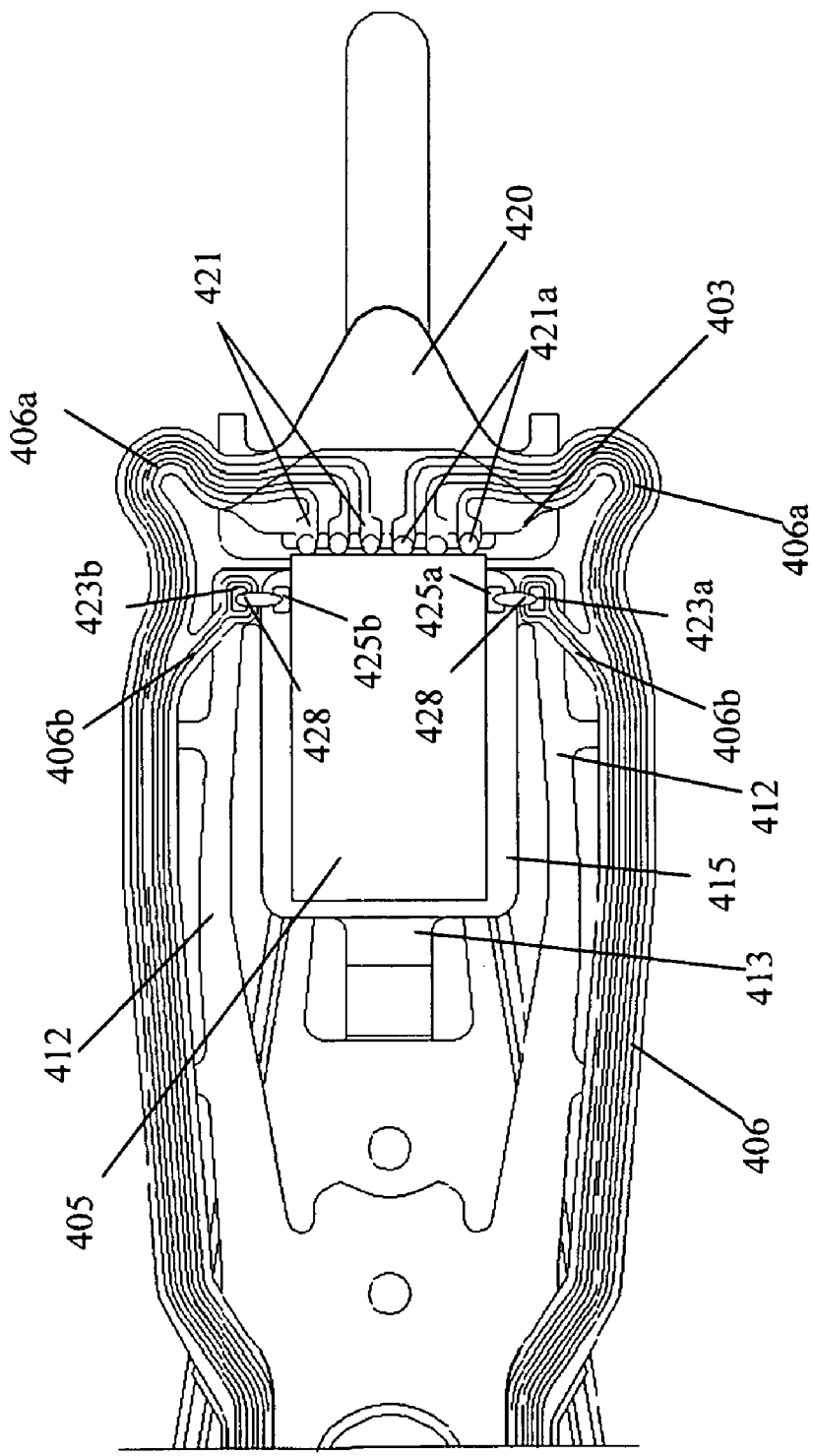
FIG. 5a is a partially enlarged top plan view of a HGA incorporating the suspension shown in FIG. 4.

FIG. 5a is a partially enlarged top plan view of a HGA incorporating the suspension shown in FIG. 4. Referring to FIG. 4 and FIG. 5, the load beam 404 is used to transfer load forces to the flexure 403 and a slider 405 mounted on the flexure 403. Any suitable rigid material such as stainless steel may be used to form the load beam 404 such that the load beam 404 has sufficient stiffness to transfer the load forces to the flexure 403. The load beam 404 is connected to the base plate 401 by the hinge 402. A locating hole 404a is formed on the load beam 404 for aligning itself with the flexure 403. A dimple 404b is formed on the load beam 404 to support the flexure 403 at a position corresponding to a center of the slider 405. By this engagement of the dimple 404b with the flexure 403, the load forces can be transferred to the center of the slider 405 uniformly.

The base plate 401 is used to enhance structure stiffness of the whole suspension and may be made of rigid material such as stainless steel. A mounting hole 401a is formed on one end of the base plate 401 for mounting the whole suspension 430 to a motor arm of a disk drive.

The hinge 402 has a mounting hole 402a formed on its one end corresponding to the mounting hole 401a of the base plate 401, and the hinge 402 is partially mounted to the base plate 401 with the mounting holes 402a, 401a aligned with each other. The hinge 402 and the base plate 401 may be bonded together by laser welding at a plurality of pinpoints distributed on the hinge 402. In addition, a hinge step 402c may be integrally formed at one side of the hinge 402 at one end adjacent the mounting hole 402a, for strengthening stiffness of the hinge 402. Two hinge struts 402b are extended from the other end of the hinge 402 to partially mount the hinge 402 to the load beam 404.

The flexure 403 is made of flexible material and runs from the hinge 402 to the load beam 404. The flexure 403 has a tail portion 403b adjacent the hinge 402 and a top portion 403a adjacent the load beam 404. A locating hole 403c is formed in the top portion 403a of the flexure 403 and is aligned with the locating hole 404a of the load beam 404. The perfect alignment between the locating holes 403c and 404a can assure a high assembly precision between the flexure 403 and the load beam 404. A suspension tongue 413 is provided at the top portion 403a of the flexure 403 to support a slider thereon. A vibration sensor 415 is mounted on the suspension tongue 413. A plurality of traces 406 runs along the flexure 403 on both sides, from the suspension tongue 413 toward the tail portion 403b, to connect with a flex cable of the VCM (not shown).

Figure 5B:
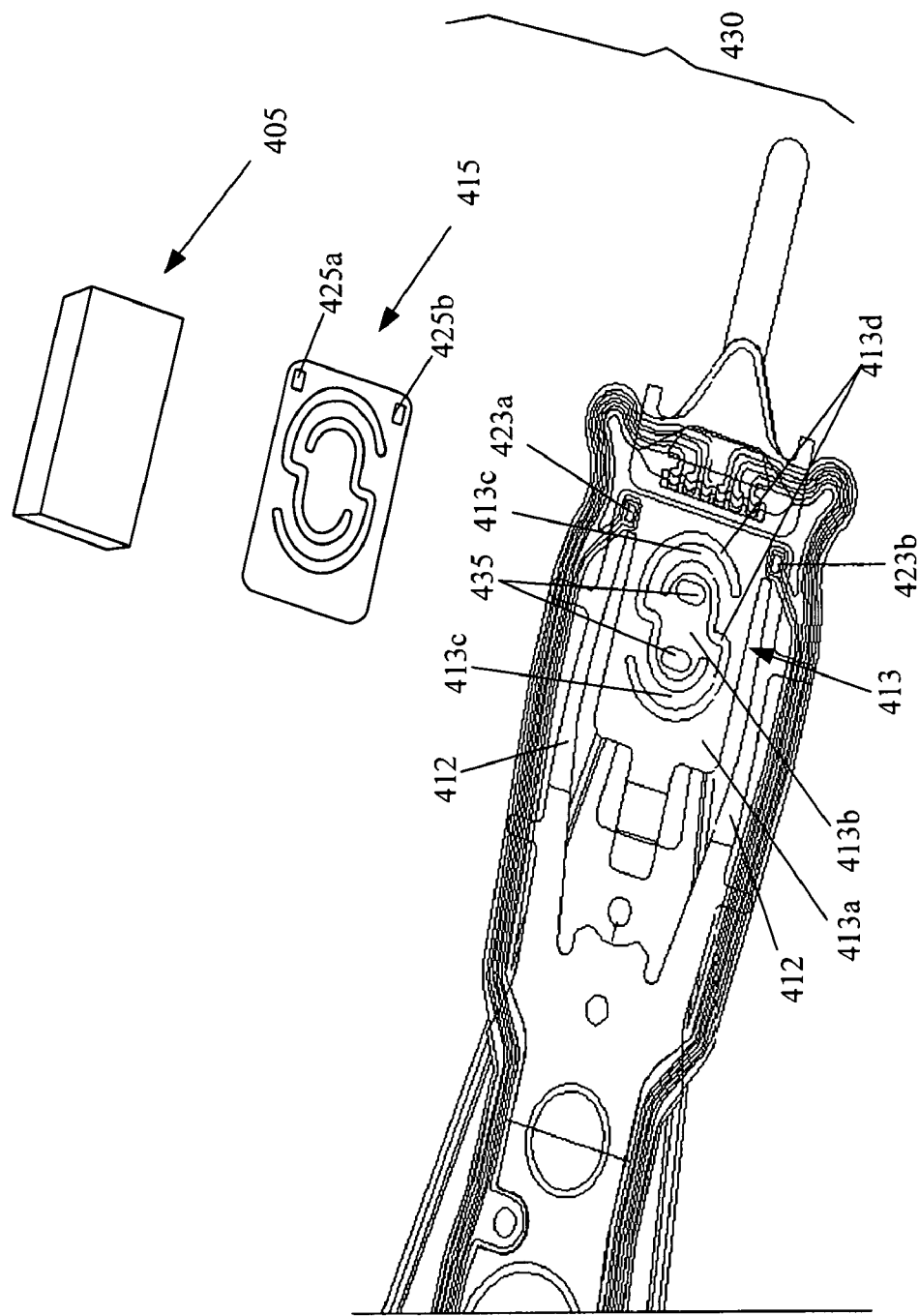
Figure 5C:
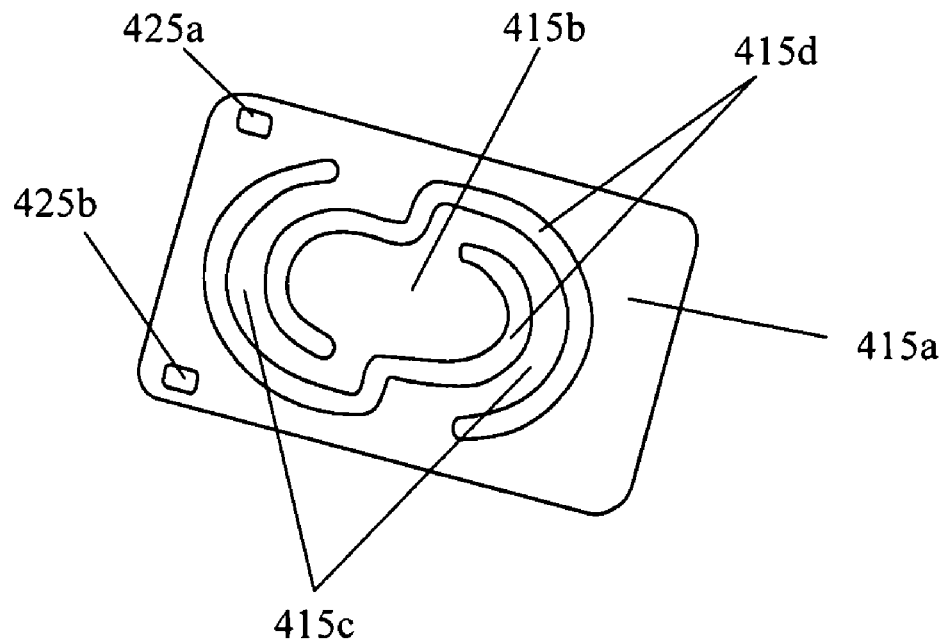
FIG. 5c is a perspective view of a vibration sensor of the HGA shown in FIG. 5b.

Now referring to FIG. 5c, the vibration sensor 415 has a base portion 415a, a loading portion 415b formed within the base portion 415a, and two connection arms 415c connecting the base portion 415a to the loading portion 415b. The base portion 415a has two electrical pads 425a and 425b formed thereon, which is electrically connected to the suspension tongue 413 of the flexure 403 via two bonding balls 428. In this embodiment, the loading portion 415b is ellipse shape, and the slider 405 is mounted on the loading portion 415b by epoxy. Detailedly, the connection arms 415c are symmetric about a centre point of the loading portion 415b. Two curving slots 415d formed in the vibration sensor 415 and between the base portion 415a and the loading portion 415b, which are two cross shaped slots extending in opposite direction, defines the two connection arms 415c of the vibration sensor 415. The connection arms 415c are not limited to two but can vary according to requirements.

Figure 5D:
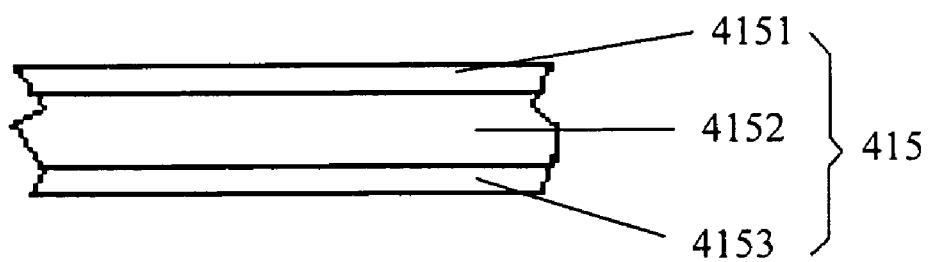
FIG. 5d is a side elevational view of the vibration sensor shown in FIG. 5c.

In conjunction with FIG. 5d, according to the embodiment, the vibration sensor 415 comprises a top electrode layer 4151, a bottom electrode layer 4153 and a PZT layer 4152 sandwiched between the top electrode layer 4151 and the bottom electrode layer 4153. The electrical pads 425a and 425b (show in FIG. 5a) are electrically connected with the top electrode layer 4151 and the bottom electrode layer 4153, respectively. In one of other embodiments of this invention, the vibration sensor 415 may be a multiple layer of PZT material, each layer comprises a top electrode layer, a bottom electrode layer and a PZT layer sandwiched between the top electrode layer and the bottom electrode layer. The electrical pads 425a and 425b are electrically connected with the every top electrode layer and the bottom electrode layer by parallel or series.

Referring to FIGS. 5a-5c, the suspension tongue 413 has a structure corresponding to the vibration sensor 415. The suspension tongue 413 comprises a second tongue 413a, a first tongue 413b formed within the second tongue 413a, and two connection legs 413c connecting the first tongue 413b to the second tongue 413a. Concretely, the second tongue 413a includes a float portion 420 with a plurality of pads 421 formed thereon, and two electrical pads 423a and 423b formed on the second tongue 413a at edges thereof. The base portion 415a, the loading portion 415b and the connection arms 415c of the vibration sensor 415 correspond to the second tongue 413a, the first tongue 413b and connection legs 415c of the suspension tongue 413 respectively. Also, the suspension tongue 413 has curving slots 413d provided therein, which correspond to the curving slots 415d of the vibration sensor 415. Furthermore, the first tongue 413b is ellipse shape. There are two epoxy dots 435 deposited on the first tongue 413b, whereby the vibration sensor 415 mounted on the suspension tongue 413, and the slider 405 is mounted on the vibration sensor 415.

Alternatively, the vibration sensor 415 may be integrally formed with the suspension tongue 413.

FIGS. 5a-5b show a detail structure of a HGA incorporating the suspension shown in FIG. 4 in the suspension tongue region. Referring to FIGS. 5a-5b, the flexure 403 has two out triggers 412 respectively formed on both sides thereof, supporting the suspension tongue 413 and controlling the PSA/RSA of the suspension 430. The traces 406 are divided into two parts: first traces 406a and second traces 406b, with the two supported by the float portion 420 and the out triggers 412, respectively. The slider 405 having multiple electrical pads (not show) formed thereon is located on the suspension tongue 413. The pads 421 are electrically connected with the first traces 406a, and the pads 421 is electrically connected with the electrical pads which are formed on the slider 405 by electrical balls 421a, such as golden bonding ball and solder bonding ball. The vibration sensor 415 is sandwiched between the slider 405 and the suspension tongue 413, with the loading portion 415b bonded with the first tongue 413b. The electrical pads 425a and 425b are electrically connected with electrical pads 423a and 423b which are formed on the suspension tongue 413 by bonding balls 428, thus electrically connecting to the second traces 406b of the flexure 403.

Figure 6:
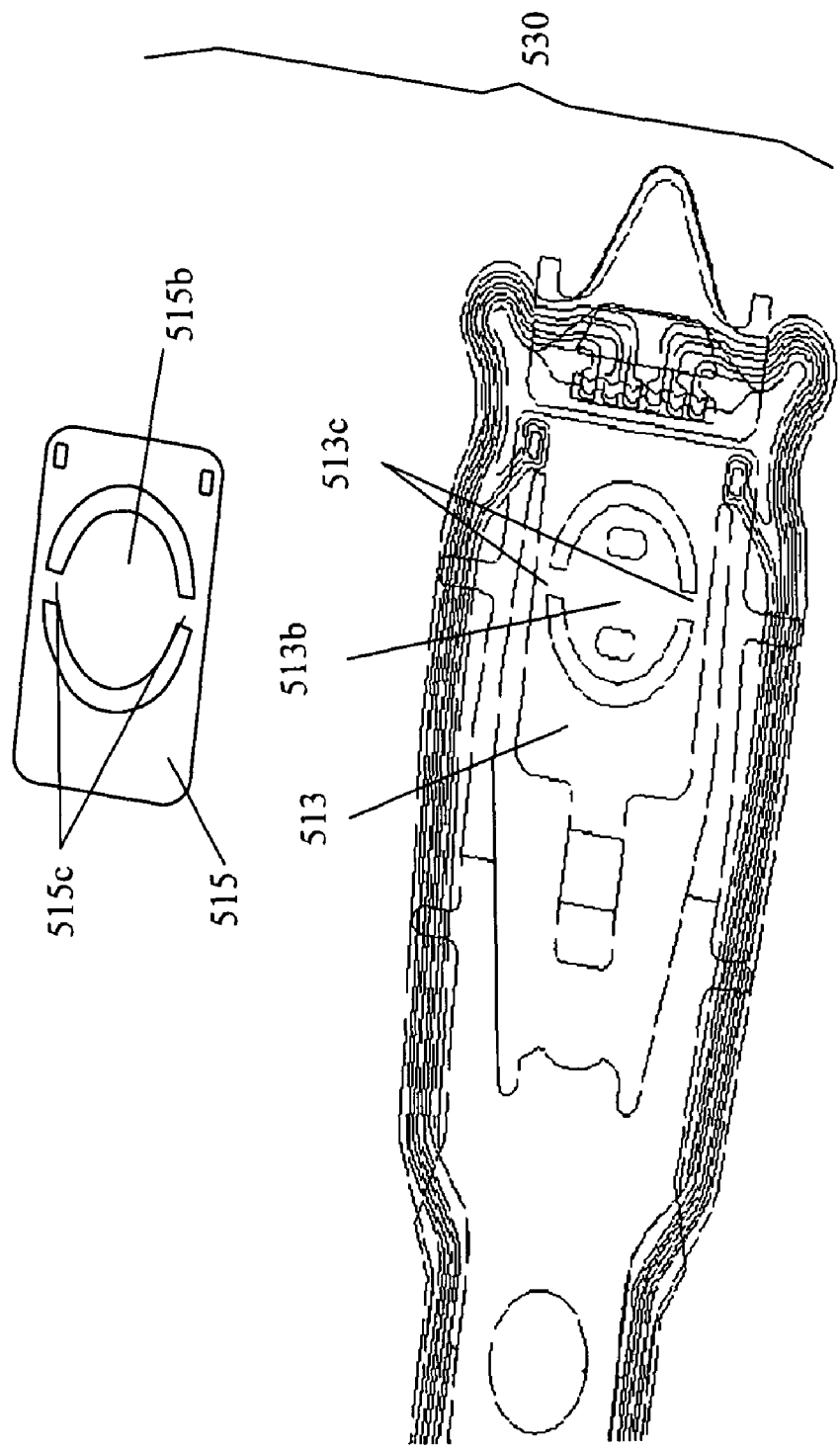
FIG. 6 is an exploded perspective view of a suspension according to a second embodiment of the present invention.

FIG. 6 illustrates a suspension 530 according to a second embodiment of the present invention. The structure of the suspension 530 of the second embodiment is similar to that of the suspension 430 shown in FIG. 5b associated with the first embodiment, except the connection arms 515c of the vibration sensor 515, the connection legs 513c of the suspension tongue 513, and the shapes of the loading portion 515b and the first tongue 513b. Referring to FIG. 6, in this embodiment, the two connection arms 515c of the vibration sensor 515 are symmetric about a centre line of the loading portion 515b which is along the length direction of the vibration sensor 515. Correspondingly, two connection legs 513c of the suspension tongue 513 are symmetric about a centre line of the first tongue 513b, which is along the length direction of the suspension tongue 513. The shapes of the loading portion 515b and the first tongue 513b are circular.

Figure 7:
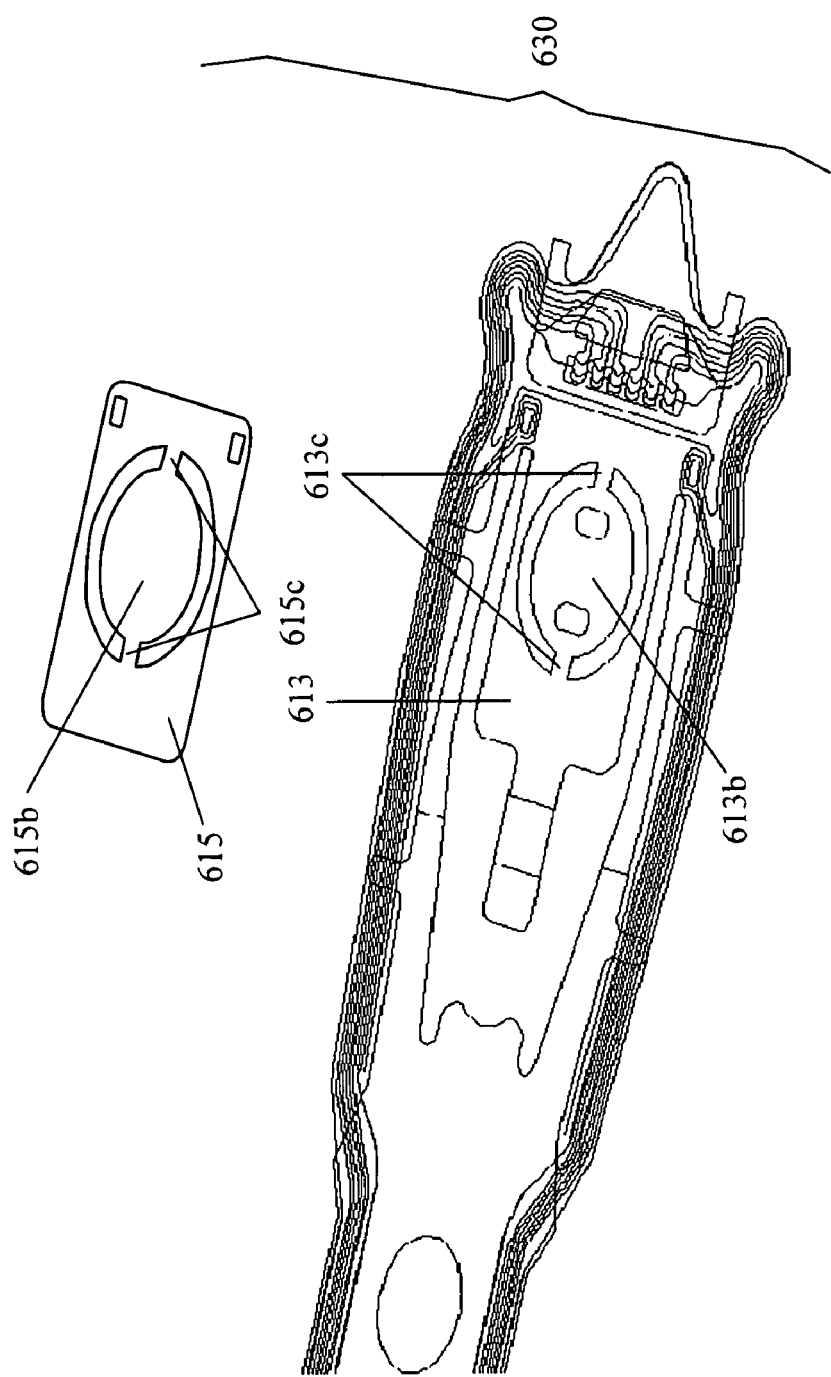
FIG. 7 is an exploded perspective view of a suspension according to a third embodiment of the present invention.

FIG. 7 illustrates a suspension 630 according to a third embodiment of the present invention. The structure of the suspension 630 of the third embodiment is similar to that of the suspension 530 of the second embodiment as shown in FIG. 6, except the connection arms 615c of the vibration sensor 615 and the connection legs 613c of the suspension tongue 613. Referring to FIG. 7, two connection arms 615c of the vibration sensor 615 are symmetric about a centre line of the loading portion 615b which is along a widthwise direction of the vibration sensor 615, and almost aligned in a line along a longitudinal direction of the suspension 630. Correspondingly, two connection legs 613c of the suspension tongue 613 are symmetric about a centre line of the first tongue 613b which is along the widthwise direction of the suspension tongue 613.

Figure 8:
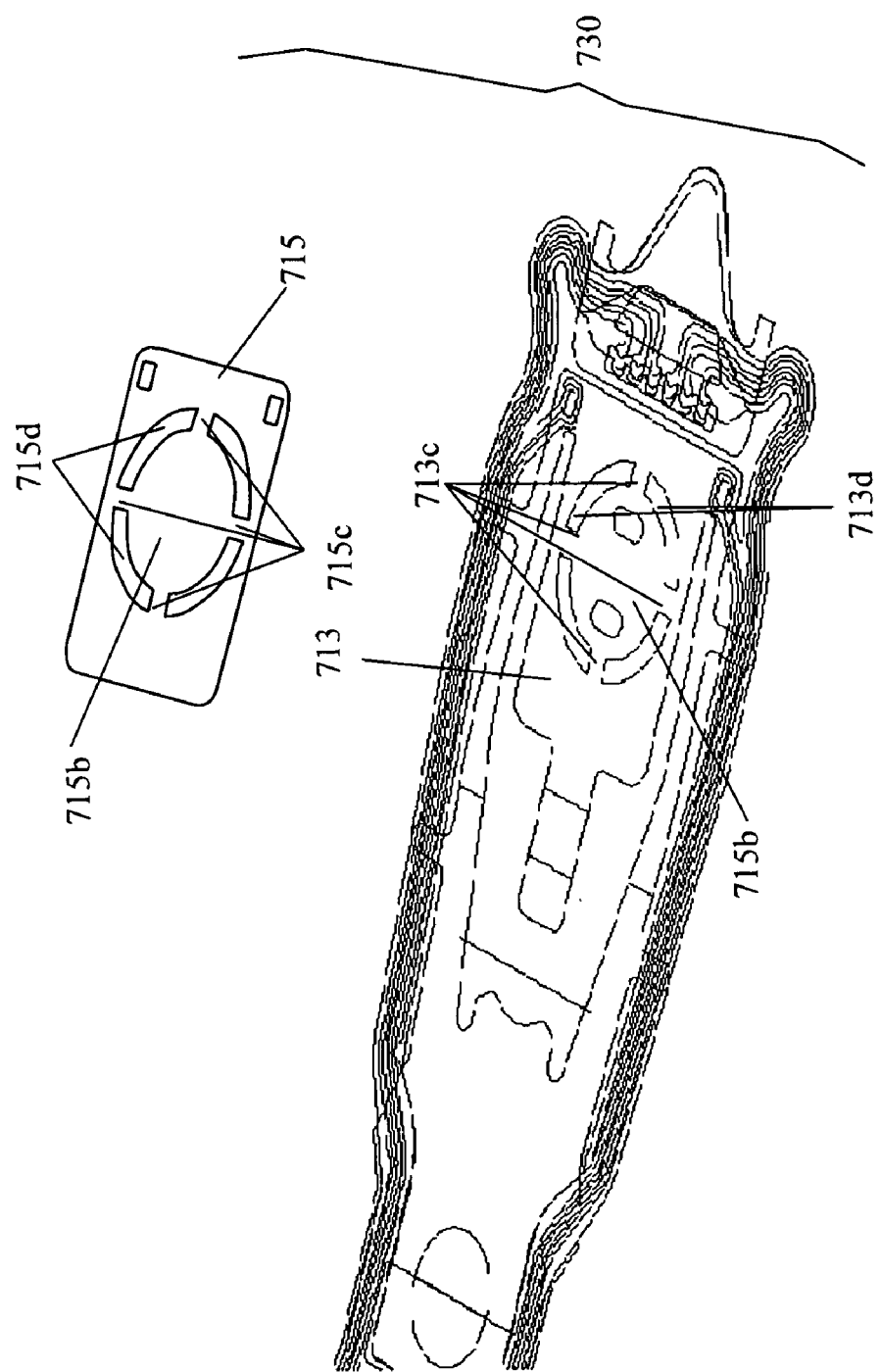
FIG. 8 is an exploded perspective view of a suspension according to a fourth embodiment of the present invention.

FIG. 8 illustrates a suspension 730 according to a fourth embodiment of the present invention. The structure of the suspension 730 of the fourth embodiment is similar to that of the suspension 630 of the third embodiment shown in FIG. 7, except the connection arms 715c of the vibration sensor 715 and the connection legs 713c of the suspension tongue 713. Referring to FIG. 8, in this embodiment, there are four connection arms 715c provided in the vibration sensor 715, which are symmetric about a centre point of the loading portion 715b. And four arc-shaped slots 715d formed in the vibration sensor 715 define the loading portion 715b to a circular. Correspondingly, four connection legs 713c of the suspension tongue 713 are symmetric about a centre point of the first tongue 713b. The slots 713d formed in the suspension tongue 713 define the first tongue 713b to a circular.

Figure 9:
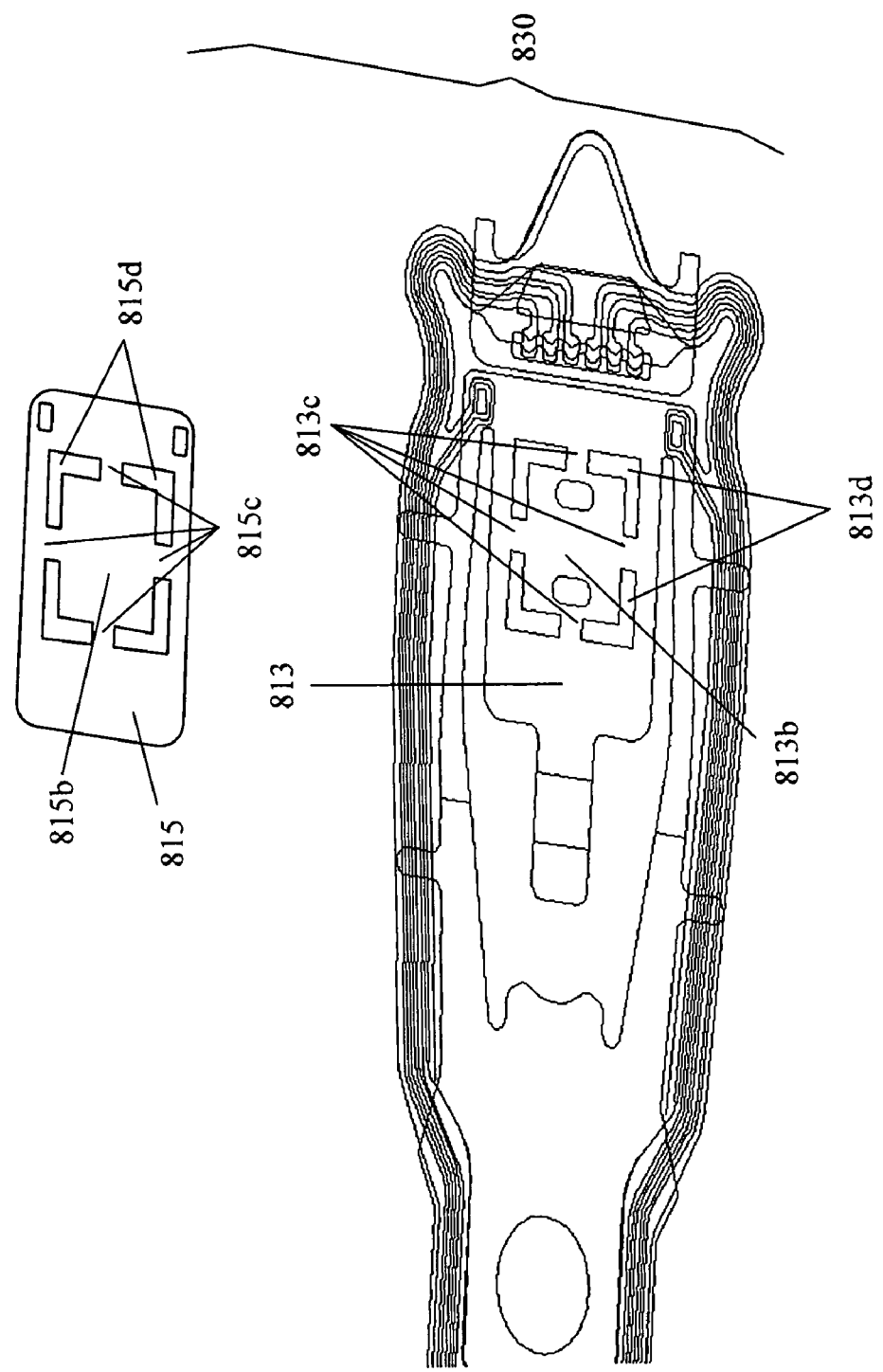
FIG. 9 is an exploded perspective view of a suspension according to a fifth embodiment of the present invention.

FIG. 9 illustrates a suspension 830 according to a fifth embodiment of the present invention. The structure of the suspension 830 of the fifth embodiment is similar to that of the suspension 730 of the fourth embodiment shown in FIG. 8, except the shapes of the loading portion 815b of the vibration sensor 815 and the first tongue 813b of the suspension tongue 813. Referring to FIG. 9, in this embodiment, the four connection arms 815c of the vibration sensor 815 are symmetric about a centre point of the loading portion 815b. And four L-shaped slots 815d formed around the loading portion 815b in the vibration sensor 815 define the loading portion 815b into a squareness. Correspondingly, four connection legs 813c of the suspension tongue 813 are symmetric about a centre point of the first tongue 813b. And four L-shaped slots 813d formed in the suspension tongue 813 define the first tongue 813b into a squareness.

Figure 10:
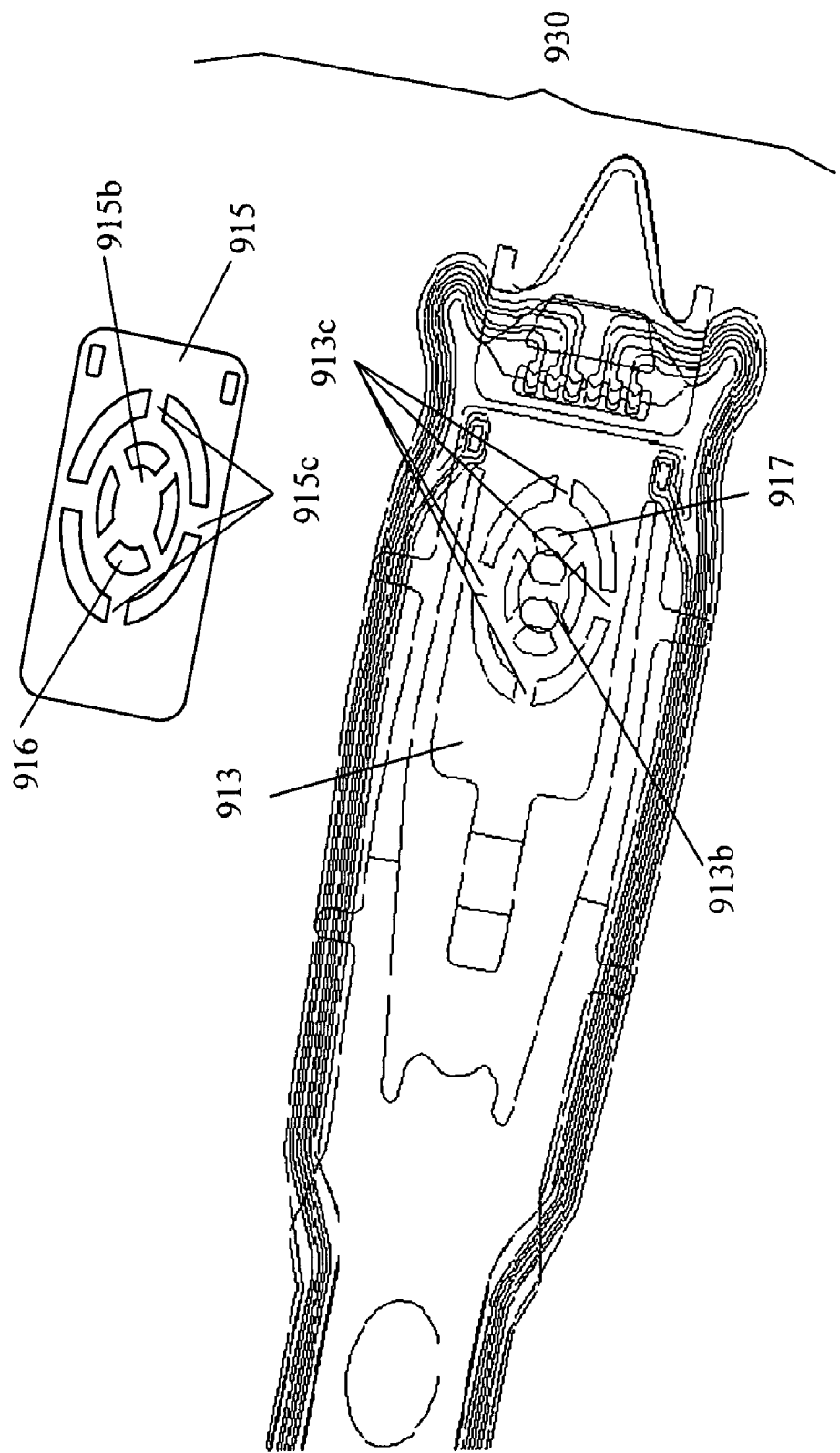
FIG. 10 is an exploded perspective view of a suspension according to a sixth embodiment of the present invention.

FIG. 10 illustrates a suspension 930 according to a sixth embodiment of the present invention. The structure of the suspension 930 of the sixth embodiment is similar to that of the suspension 730 of the fourth embodiment shown in FIG. 8, except that the loading portion 915b of the vibration sensor 915 and the first tongue 913b of the suspension tongue 913 respectively have four through holes 916 and 917 provided therein. Referring to FIG. 10, in this embodiment, four connection arms 915c of the vibration sensor 915 are symmetric about a centre point of the loading portion 915b. And the through holes 916 are symmetric about a centre point of the loading portion 915b. Correspondingly, four connection legs 913c of the suspension tongue 913 are symmetric about a centre point of the first tongue 913b. And the through holes 917 are symmetric about a centre point of the first tongue 913b. The through holes 916 and 917 can further decrease the stiffness of the suspension 930, thus obtaining a bigger sensitivity for the vibration of the slider.

Figure 11A:
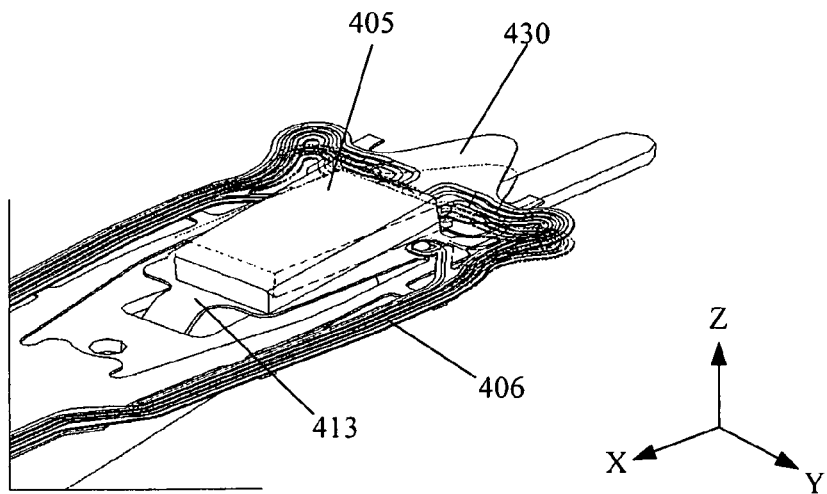
FIG. 11a is a perspective view illustrating the motion of the HGA in pitch direction, when a shock event or vibration coming to the suspension.
Figure 11B:
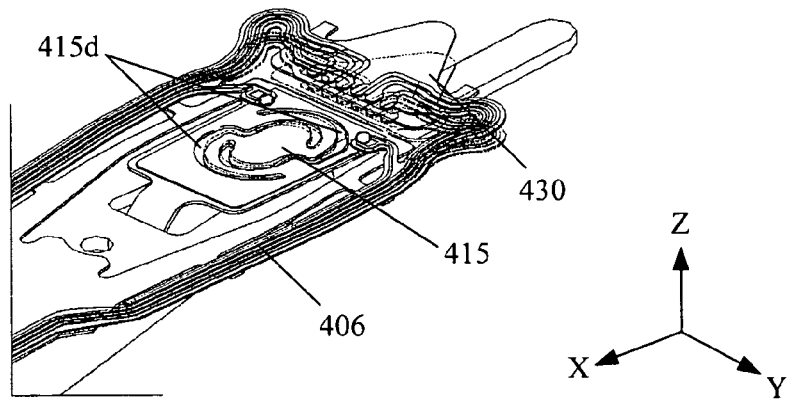
FIG. 11b is a perspective view illustrating the state of the suspension shown in FIG. 11a after the slider is removed.
Figure 11C:
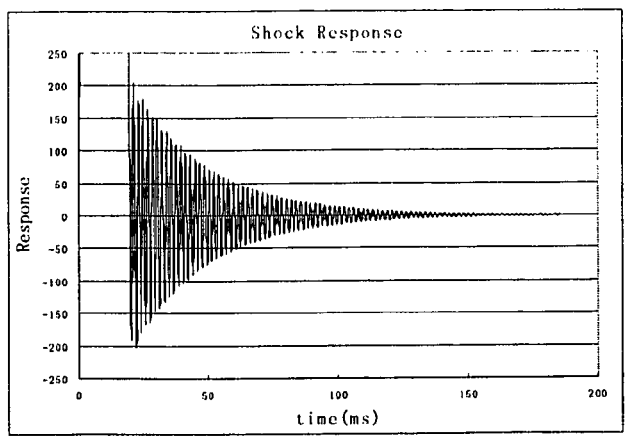
FIG. 11c shows a waveform illustrating the vibration signal generated by the vibration sensor of the suspension shown in FIG. 11b.

Referring to FIGS. 11a-11b, it demonstrates how the vibration sensor 415 works. Referring to 11a, when a shock event or vibration come to the suspension 430, the slider 405 will move in pitch direction (X-axis direction) against the dimple (not show). Since the vibration sensor 415 has the slots 415d formed therein and the suspension tongue 413 has the corresponding structure, which are both lower stiffness structures, the vibration sensor 415 which includes PZT material and is mounted beneath the slider 405 will sense the motion of the slider 405 easily and, in turn, the vibration sensor 415 will deform and generate a vibration signal with a cert frequency. As shown in FIG. 11c, a signal waveform is shown according to this vibration signal. This signal runs to the integrated chips of the PCBA of the HDD (not show) by traces 406, the servo system will detect the vibration signal in initial just before shock event happen, control the head read/write per this vibration signal, for example, stop the head read/write function and move the head to safety location (parking in landing zoom or back to the ramp). Thus, the head and/or the disk damage are prevented even if the shock event happen. As the same, if there is a only a vibration event happen during the head read/write function, the servo system can also feedback and compensate this vibration in its servo close loop, the position of the slider 405 will be adjusted to achieve a good flying stability and dynamic performance.

Figure 12A:
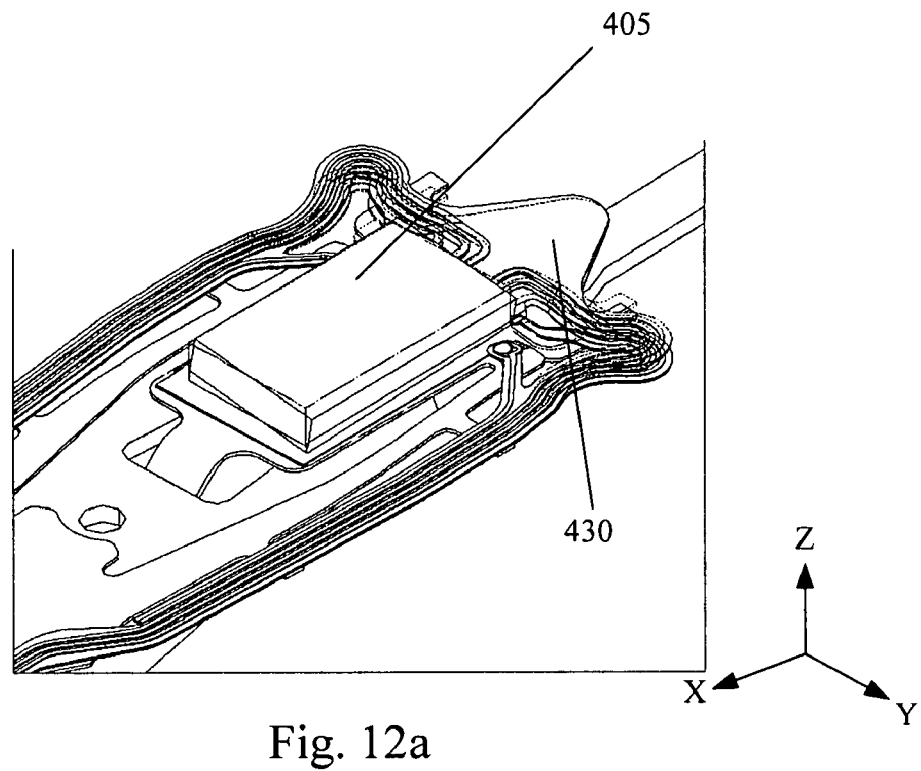
FIG. 12a is a perspective view illustrating the motion of a HGA in another direction, when a shock event or vibration coming to the suspension.
Figure 12B:
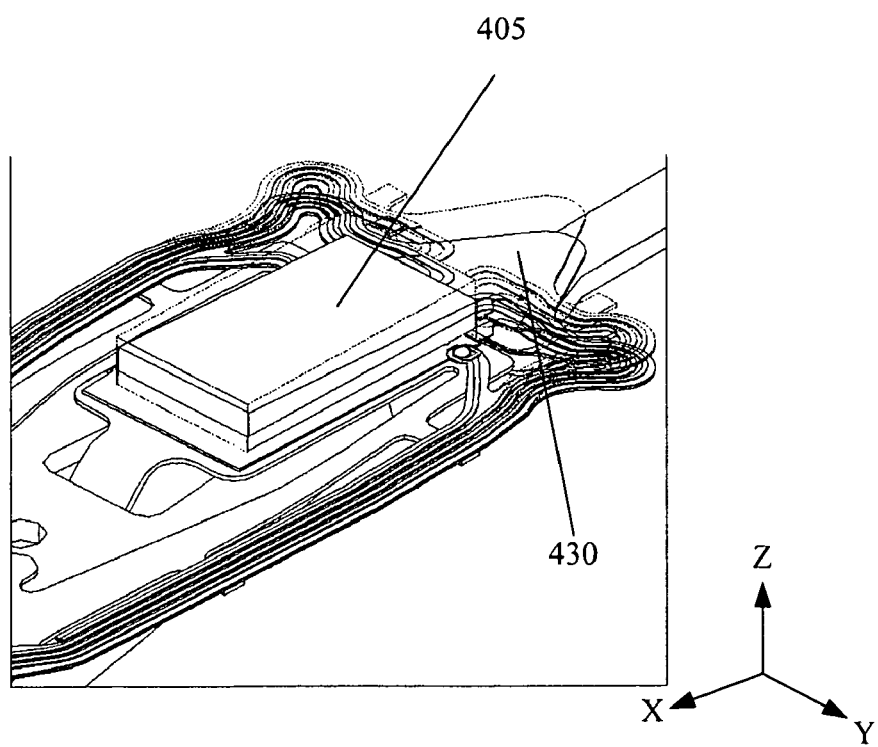
FIG. 12b is a perspective view illustrating the motion of a HGA in yet another direction, when a shock event or vibration coming to the suspension.

Referring to FIG. 12a, in another case, the slider 405 moves in roll direction (Y-axis direction), when a shock or vibration event come from Y direction to the suspension 430. Referring to FIG. 12b, yet under another situation, the slider 405 will move up and down (Z-axis direction), when a shock or vibration event come from Z direction to the suspension 430. As for the vibration sensor 415, since the loading portion 415b is connected with the base portion 415a by two connecting arms 415c, the vibration sensor 415 can deforms easily and generates a vibration signal with a cert frequency to the integrated chips of the PCBA of the HDD (not show) by traces 406 (show in FIG. 5a), the servo system will detect the vibration signal in initial just before shock event happen, control the head read/write per this vibration signal, for example, stop the head read/write function and move the head to safety location (parking in landing zoom or back to the ramp). Thus, the head and/or the disk damage are prevented even if the shock event happen. As the same, if there is a only a vibration event happen during the head read/write function, the servo system can also feedback and compensate this vibration in its servo close loop. And then the position of the slider 405 will be adjusted to achieve a good flying stability and dynamic performance.

Figure 13:
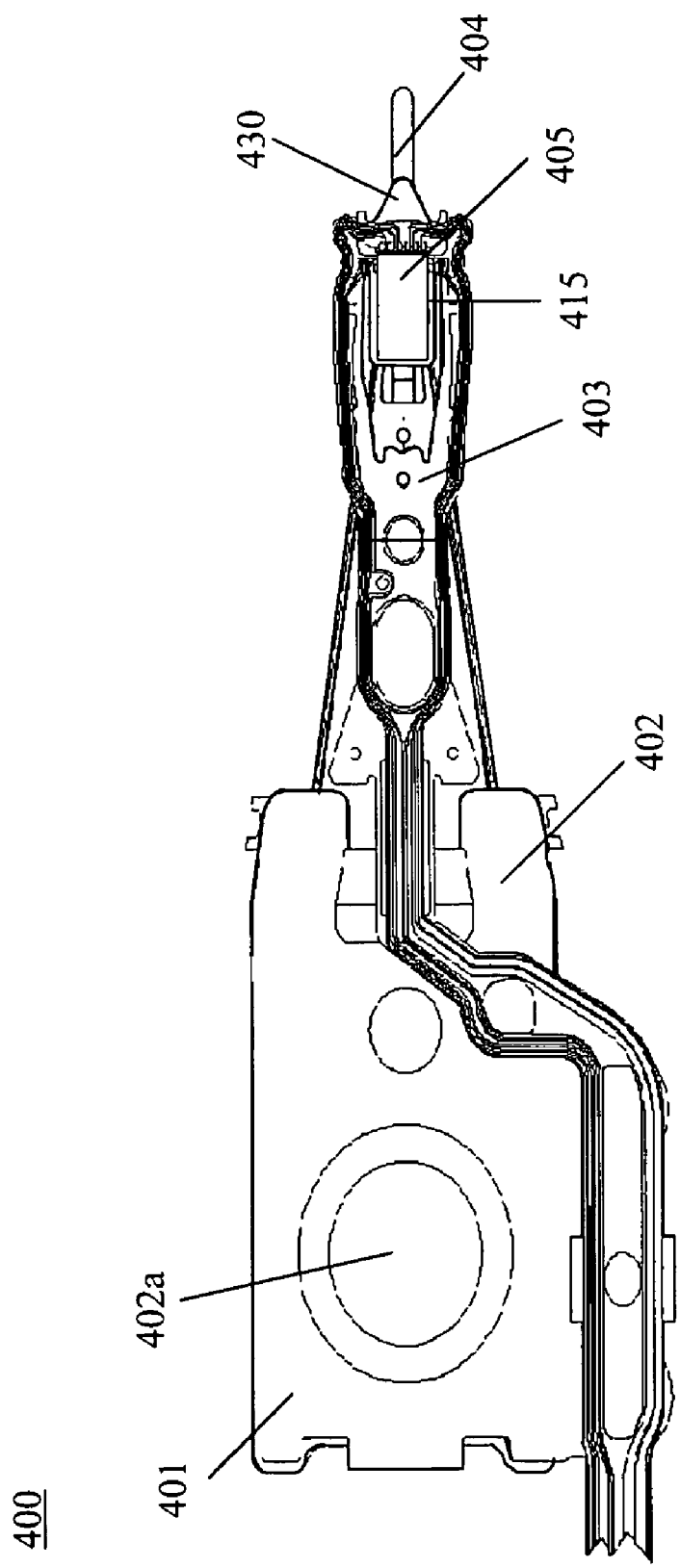
FIG. 13 is a top plan view of the HGA shown in FIG. 5a according to the first embodiment of the present invention.

Now, referring to FIG. 13, a HGA 400 according to an embodiment of the invention comprises the suspension 430 and the slider 405 carried on the suspension 430. The suspension 430 comprises the vibration sensor 415, the load beam 404, the base plate 401, the hinge 402 and the flexure 403, all of which are assembled with each other. The hinge 402 has a mounting hole 402a formed thereon to assemble the hinge 402 to the base plate 401. And then the slider 405 is carried on the flexure 403. The vibration sensor 415 is mounted between the slider 405 and the suspension tongue 413.

It should be noted that the suspension 430 may be replaced by any one of the suspension 530, 630, 730, 830 and 930 which are described in the embodiment motioned above.

Figure 14:
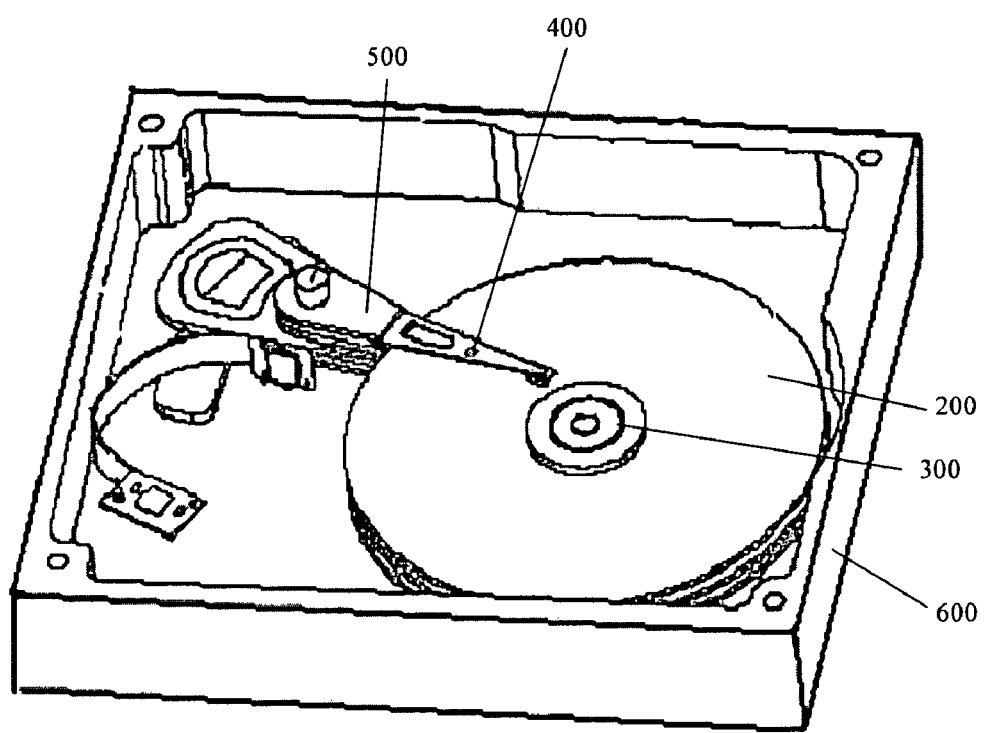
FIG. 14 is a perspective view of a disk drive unit according to an embodiment of the invention.

FIG. 14 is a disk drive unit 100 according to an embodiment of the invention. The disk drive unit 100 comprises the HGA 400, a drive arm 500 connected to the HGA 400, a series of rotatable disks 200, and a spindle motor 300 to spin the disk 200, all of which are mounted in a housing 600. Because the structure and/or assembly process of disk drive unit of the present invention are well known to persons ordinarily skilled in the art, a detailed description of such structure and assembly is omitted herefrom.

Figure 15:
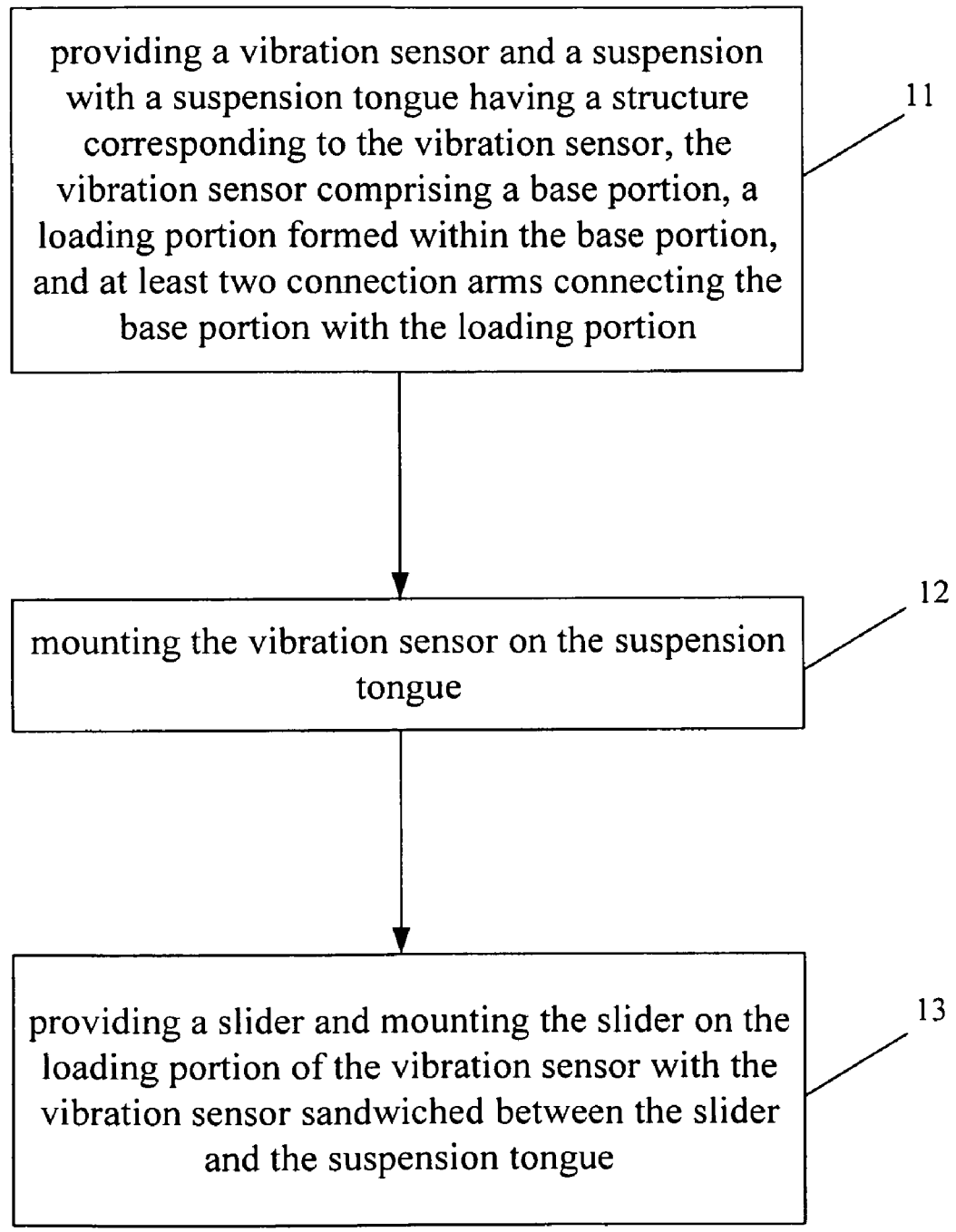
FIG. 15 is a flow chart illustrating a manufacturing method of a HGA with a vibration sensor according to an embodiment of the present invention.

FIG. 15 illustrates the primary steps involved in the manufacturing process of the HGA according to an embodiment of the present invention, which includes the steps of: 11) providing a vibration sensor and a suspension with a suspension tongue having a structure corresponding to the vibration sensor, the vibration sensor comprising a base portion, a loading portion formed within the base portion, and at least two connection arms connecting the base portion with the loading portion; 12) mounting the vibration sensor on the suspension tongue; 13) providing a slider and mounting the slider on the loading portion of the vibration sensor with the vibration sensor sandwiched between the slider and the suspension tongue.

Perfectly, the step of mounting the vibration sensor on the suspension tongue comprises bonding the loading portion of the vibration sensor to the suspension tongue, such as by epoxy, and electrically connecting the vibration sensor with the suspension.

The method in accordance with manufacturing the HGA process, is applied for the above-mentioned embodiments as well.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A vibration sensor for a slider, comprising:
   a base portion;
   a loading portion adapted for supporting the slider mounted thereon and formed within the base portion; and
   at least two connection arms connecting the base portion with the loading portion, wherein the vibration sensor is mounted on a suspension tongue and sandwiched between the suspension tongue and the slider.

2. The vibration sensor as claimed in claim 1, wherein the connection arms are symmetric about a centre point of the loading portion.

3. The vibration sensor as claimed in claim 1, wherein the loading portion having a plurality of through holes formed therein.

4. The vibration sensor as claimed in claim 3, wherein the through holes are symmetric about a centre point of the loading portion.

5. The vibration sensor as claimed in claim 1, wherein the loading portion is ellipse shape, squareness, or circular.

6. The vibration sensor as claimed in claim 1, wherein the vibration sensor comprises a top electrode layer, a bottom electrode layer and a PZT layer sandwiched between the top electrode layer and the bottom electrode layer.

7. A suspension for a head gimbal assembly comprising:
   a flexure with a suspension tongue for supporting a slider of the head gimbal assembly; and
   a vibration sensor mounted on the suspension tongue and sandwiched between the suspension tongue and the slider,
   wherein the vibration sensor comprises a base portion, a loading portion formed within the base portion and adapted for supporting the slider mounted thereon, and at least two connection arms connecting the base portion with the loading portion; and the suspension tongue has a structure corresponding to the vibration sensor.

8. The suspension as claimed in claim 7, wherein the base portion has at least two electrical pads formed thereon, and the suspension tongue comprises a first tongue bonding with the base portion, a second tongue with a plurality of pads disposed thereon for electrically connecting with the slider and the electrical pads of the base portion, and at least two connection legs connecting the first tongue to the second tongue.

9. The suspension as claimed in claim 7, wherein the connection arms are symmetric about a centre point of the loading portion.

10. The suspension as claimed in claim 7, wherein the loading portion having a plurality of through holes formed therein.

11. The suspension as claimed in claim 10, wherein the through holes are symmetric about a centre point of the loading portion.

12. The suspension as claimed in claim 7, wherein the loading portion is ellipse shape, squareness, or circular.

13. The suspension as claimed in claim 7, wherein the vibration sensor comprises a top electrode layer, a bottom electrode layer and a PZT layer sandwiched between the top electrode layer and the bottom electrode layer.

14. The suspension as claimed in claim 7, wherein the vibration sensor is integrally formed with the suspension tongue.

15. A head gimbal assembly, comprising:
    a slider;
    a suspension having a flexure with a suspension tongue for supporting the slider; and
    a vibration sensor mounted on the suspension tongue and sandwiched between the slider and the suspension tongue,
    wherein the vibration sensor comprises a base portion, a loading portion supporting the slider mounted thereon formed within the base portion, and at least two connection arms connecting the base portion with the loading portion, and the suspension tongue has a structure corresponding to the vibration sensor.

16. The head gimbal assembly as claimed in claim 15, wherein the base portion has at least two electrical pads formed thereon, and the suspension tongue comprises a first tongue bonding with the base portion, a second tongue with a plurality of pads disposed thereon for electrically connecting with the slider and the electrical pads of the base portion, and at least two connection legs connecting the first tongue to the second tongue.

17. The head gimbal assembly as claimed in claim 16, wherein the connection arms are symmetric about a centre point of the loading portion.

18. The head gimbal assembly as claimed in claim 15, wherein the loading portion has a plurality of through holes formed therein.

19. The head gimbal assembly as claimed in claim 15, wherein the through holes of the vibration sensor are symmetric about a centre point of the loading portion.

20. The head gimbal assembly as claimed in claim 15, wherein the loading portion is ellipse shape, squareness, or circular.

21. A disk drive unit, comprising:
    a head gimbal assembly including a slider and a suspension with a suspension tongue that supports the slider, wherein the head gimbal assembly further comprises a vibration sensor mounted on the suspension tongue and sandwiched between the slider and the suspension tongue, wherein the vibration sensor comprises a base portion, a loading portion for supporting the slider mounted thereon formed within the base portion, and at least two connection arms connecting the base portion with the loading portion, and wherein the suspension tongue has a structure corresponding to the vibration sensor;
    a drive arm connected to the head gimbal assembly;
    a disk; and
    a spindle motor operable to spin the disk.

22. The disk drive unit as claimed in claim 21, wherein the base portion has at least two electrical pads formed thereon, and the suspension tongue comprises a first tongue bonding with the base portion, a second tongue with a plurality of pads disposed thereon for electrically connecting with the slider and the electrical pads of the base portion, and at least two connection legs connecting the first tongue to the second tongue.

23. A method for manufacturing a head gimbal assembly, comprising:
    providing a vibration sensor and a suspension with a suspension tongue having a structure corresponding to the vibration sensor, the vibration sensor comprising a base portion, a loading portion formed within the base portion, and at least two connection arms connecting the base portion with the loading portion;

mounting the vibration sensor on the suspension tongue; and providing a slider and mounting the slider on the loading portion of the vibration sensor with the vibration sensor sandwiched between the slider and the suspension tongue.

24. The method as claimed in claim 23, wherein the step of mounting the vibration sensor on the suspension tongue comprises:

bonding the loading portion to the suspension tongue; and electrically connecting the vibration sensor with the suspension.

* * * * *